(12) United States Patent
Yang et al.

(10) Patent No.: US 6,760,684 B1
(45) Date of Patent: Jul. 6, 2004

(54) METHOD AND MECHANISM FOR PROFILING A SYSTEM

(75) Inventors: Tao-Heng Yang, Cupertino, CA (US); Andrew Rist, Menlo Park, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 10/376,678

(22) Filed: Feb. 26, 2003

Related U.S. Application Data

(62) Division of application No. 09/303,815, filed on Apr. 30, 1999, now Pat. No. 6,542,854.

(51) Int. Cl.[7] .............................................. G06F 17/30
(52) U.S. Cl. ....................... 702/182; 702/108; 702/113; 702/118; 702/183; 702/184
(58) Field of Search ................................ 702/108, 113, 702/114, 115, 118–123, 179, 182–188; 709/229, 228, 225, 241, 224; 714/721; 707/1, 2, 3, 4

(56) References Cited

U.S. PATENT DOCUMENTS

| | | | |
|---|---|---|---|
| 3,905,230 A | | 9/1975 | Calvet et al. |
| 4,862,351 A | * | 8/1989 | Green et al. ................ 712/242 |
| 5,072,376 A | | 12/1991 | Ellsworth |
| 5,361,353 A | | 11/1994 | Carr et al. |
| 5,365,514 A | | 11/1994 | Hershey et al. |
| 5,375,070 A | | 12/1994 | Hershey et al. |
| 5,504,887 A | | 4/1996 | Malhotra et al. |
| 5,734,884 A | * | 3/1998 | Eberhard et al. .............. 707/2 |
| 5,745,749 A | | 4/1998 | Onodera |
| 5,761,081 A | | 6/1998 | Agrawal et al. |
| 5,761,654 A | * | 6/1998 | Tow .............................. 707/2 |
| 5,848,270 A | | 12/1998 | DeLuca et al. |
| 5,860,069 A | * | 1/1999 | Wright .......................... 707/4 |
| 5,892,945 A | | 4/1999 | Mirchandaney et al. |
| 5,950,212 A | | 9/1999 | Anderson et al. |
| 5,960,151 A | | 9/1999 | Sandidi et al. |
| 5,970,495 A | | 10/1999 | Baru et al. |
| 5,974,457 A | | 10/1999 | Waclawsky et al. |
| 6,026,391 A | * | 2/2000 | Osborn et al. ................. 707/2 |
| 6,035,306 A | | 3/2000 | Lowenthal et al. |
| 6,126,657 A | | 10/2000 | Okanoya et al. |
| 6,182,079 B1 | * | 1/2001 | Lenzie ...................... 707/101 |
| 6,199,089 B1 | | 3/2001 | Gershman et al. |
| 6,212,514 B1 | * | 4/2001 | Eberhard et al. .............. 707/2 |
| 6,219,654 B1 | | 4/2001 | Ruffin |
| 6,230,114 B1 | | 5/2001 | Hellestrand et al. |
| 6,330,552 B1 | * | 12/2001 | Farrar et al. ................ 705/400 |
| 6,351,742 B1 | * | 2/2002 | Agarwal et al. ............... 707/3 |

OTHER PUBLICATIONS

George Koch and Robert Muller, "ORACLE7: The Completer Reference", pp. 230–231, 1990.*

* cited by examiner

*Primary Examiner*—Marc S. Hoff
*Assistant Examiner*—Carol S. W. Tsai
(74) *Attorney, Agent, or Firm*—Bingham McCutchen LLP

(57) ABSTRACT

Disclosed is a method and mechanism for sizing a hardware system for a software workload. An aspect is directed to modeling a workload into a set of generic system activities, in which the generic system activities are not directly tied to a specific hardware platform. Another aspect is directed to profiling hardware systems or hardware components into the generic system activities. Suitable hardware systems or components are selected by analyzing the workload and hardware profiles in terms of the generic system activities.

26 Claims, 6 Drawing Sheets

METHOD AND MECHANISM FOR PROFILING A SYSTEM

CROSS REFERENCE TO RELATED APPLICATIONS

This application is a divisional of U.S. application Ser. No. 09/303,815, filed on Apr. 30, 1999, now U.S. Pat. No. 6,542,854 which is hereby incorporated by reference in its entirety for all purposes as if fully set forth herein.

BACKGROUND OF THE INVENTION

1. Field of the Invention

The present invention relates to the sizing of a computer system for a computer application or activity.

2. Background

Since the introduction of computer systems, there has been a need for a method of predicting the hardware investment needed to run software applications. For example, there has been a need to determine the central processing unit (CPU) requirements, volatile memory requirements (e.g., cache memory or random access memory (RAM)), and mass storage requirements (e.g., hard disk capability) of a computing system that is capable of running a given software application at acceptable performance levels. The process of determining the appropriate hardware is referred to as "sizing" the system.

If the system is not adequately equipped, or is sized too small, the system may suffer from performance problems or be nonfunctional. On the other hand, if the system is oversized, then investments are being made for superfluous hardware and performance capability.

Specific component benchmarks can be used to test the speed of components in a system. These benchmark tests can include tests for processor, disk, and memory performance. However, the benchmarks only test the raw speed of components, but do not test the speed of a system as a whole. The performance of software applications is often constrained by the interaction between the components in a system. Thus, component benchmarks by themselves do not provide an accurate measure to size a system.

One approach for sizing a system is to use benchmark simulations to determine how a particular system would handle a potential or projected system workload. In this approach, a benchmark system is constructed having a particular configuration of components, such as CPU, RAM, and hard disk components. The benchmark system is run at operating parameters corresponding to the projected workload. This process may encompass the construction and testing of multiple benchmark system at various levels of operating capacity. By observing the operation of the system, it can be determined whether any of the benchmark systems would be suitable for the projected workload. The operating efficiencies of the multiple systems are compared so that an appropriate system configuration can be selected.

Although such an approach may eventually identify a computing system that is appropriate for the needs of the projected workload, such benchmark simulations are typically costly in terms of time and budget. That is, the equipment and labor costs of constructing multiple systems at different capability levels may be prohibitively expensive. Moreover, such a process is inefficient to perform, since each variation of component combinations must be built if it is to be benchmarked. If a customer seeks to determine, for example, how a particular brand or type of CPU would function with the projected workload, a new system having that brand or type of CPU would have to be constructed and tested. In addition, the information derived from this type of benchmark quickly becomes obsolete as the hardware used to derive the information becomes obsolete.

As the cost of candidate systems decreases, the cost effectiveness of benchmark simulations dramatically diminishes. For example, if a candidate system costs several million dollars, then spending several hundred thousand dollars on a benchmark simulation can be justified. However, if a candidate system costs several tens of thousands dollars, then spending that same amount is no longer feasible. Thus, benchmark simulations may not be suitable for many system purchasers.

Another approach is to size a system based upon a comparison with existing computing systems. In this approach, a determination is made whether other systems exist that run workloads equivalent to the projected workload. If such similar systems exist, then a comparison is made of the performance and operating requirements between the workload of the existing systems and that of the projected workload. Based upon these comparisons, the configuration of the existing system is modified in an attempt to meet the requirements of the projected workload.

This approach also suffers from drawbacks. First, it may be extremely difficult to find existing systems whose applications, organizations, and workloads are even remotely similar to the needs of the present workload application. Furthermore, attempting to match or modify a system used by others to meet a particular need of the current workload is quite challenging and inexact.

Another approach is to characterize a workload in terms of the quantity of hardware elements that would be used by that workload. In this approach, the workload is analyzed and characterized as a set of hardware components or units, and the quantity of hardware units for that workload then determines the configuration of a system capable of operating that workload. The analysis is performed with respect to a specific set of known hardware capabilities, so that an accurate characterization can be performed. For example, consider a candidate CPU that operates at 300 MHz. By breaking the workload into fundamental CPU elements (i.e., the quantity of 300 MHz CPUs needed to perform the workload), the sizing method may determine that two such CPUs are needed for the workload.

The drawback to this approach is that this analysis is directly tied to the capabilities of the particular hardware components that are used to derive the hardware units. Since the analysis is tied to a particular set of hardware components, changing the candidate hardware system requires the entire analysis of the workload to be repeated. This is particularly inefficient if minor changes to the systems are needed.

Standard benchmarks are performed for certain software applications. For example, TPC benchmarks can be performed to determine the relative performance of hardware systems to perform database operations. There are benchmarks for different kinds of database workloads. TPCC benchmarks can be performed to simulate online transaction processing ("OLTP") workloads and TPCD benchmarks can be performed to simulate decision support services ("DSS") workloads. These benchmarks provide an indication of the performance of a system to a specific benchmark. However real world workloads may be significantly different from these standard benchmarks; thus, sizing a system using these benchmark test results may result in a faulty sizing analysis. This approach is suitable for comparing different types of hardware for general database operations. It is not particularly well suited for matching a specific system with a specific workload.

Application specific benchmarks may be used to size specific software applications. However, there is a large overload associated with creating and implementing these specific benchmarks. Thus, it is not economically feasible to implement these benchmarks for all software applications.

Therefore, there is a need for a method and mechanism to address these and other issues regarding the sizing of a computer system.

SUMMARY OF THE INVENTION

The invention is directed to a method and mechanism for sizing a hardware system for a software workload. An aspect of the invention is directed to modeling a workload into a set of generic system activities, in which the generic system activities are not directly tied to a specific hardware platform. Another aspect of the invention is directed to profiling hardware systems or hardware components into the generic system activities. Suitable hardware systems or components are selected by analyzing the workload and hardware profiles in terms of the generic system activities.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without those specific details. For example, much of the following illustrative explanation is made in the context of sizing a computer system for database operations. However, the invention is equally applicable to other applications and software used on a computer system.

Overview

Figure 1:
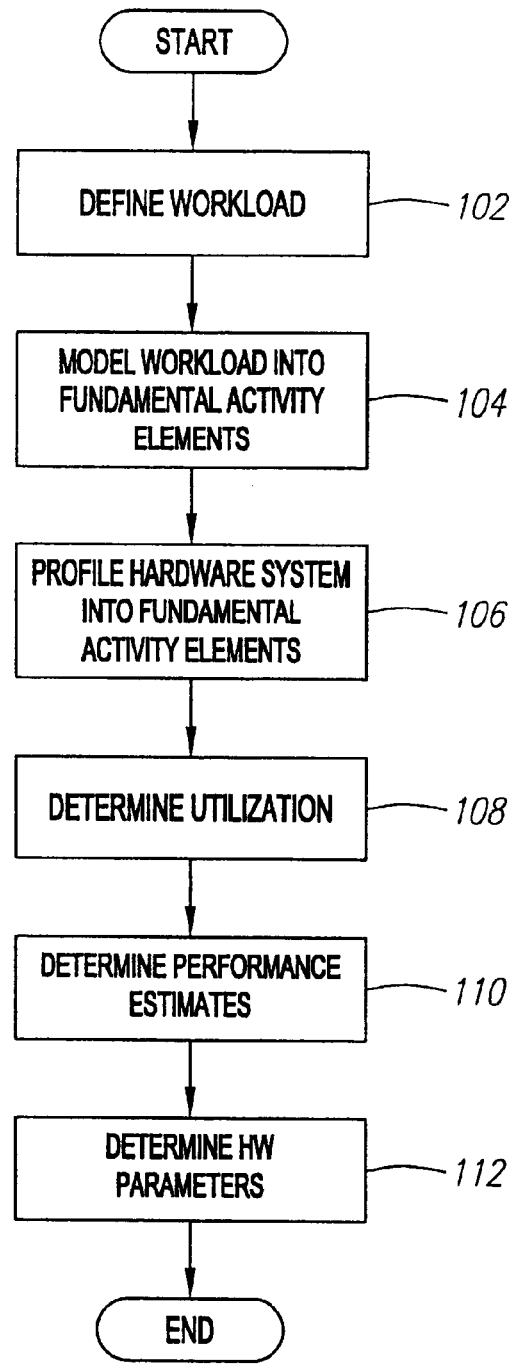
FIG. 1 depicts a process flow for system sizing according to an embodiment of the invention.

FIG. 1 depicts a process flow for sizing a system according to an embodiment of the invention. The present invention provides a method and mechanism for system sizing, capacity planning, and capacity testing. The sizing of a hardware system is performed with respect to the anticipated or actual "workload" that is to be performed by a software application. A workload is a set of actions that is performed by the software application, which may be performed on a constant or periodic basis. In process action 102, a workload is defined for the software application/system to be sized.

According to one aspect of the invention, the workload is modeled as a set of fundamental activity elements (referred to herein as computing activity elements or "CAE"), which are independent of any particular hardware system or set of hardware components (102). Each software application has certain fundamental activities which occur regardless of the hardware platform or operating system upon which it is executing. The set of CAE used to model a workload is specifically tailored to capture the fundamental activities being performed by its respective software application. Each separate software application or set of related software applications may have a dedicated set of CAE that can be used to model or describe workloads for that application. The set of CAE may also be independent of a specific operating systems environment.

For an embodiment of the invention used to size systems for database software, the following are examples of CAE elements that can be used to model a database workload:

Physical read sequential: number of read operations to sequentially distributed locations on a persistent storage device upon a cache miss;

Physical read random: number of read operations to randomly distributed locations on a persistent storage device upon a cache miss;

Logical read: number of logical read operations performed to data cached on dynamic or volatile media;

Physical write: number of write operations to persistent storage;

Logical write: number of logical write operations to data cached on dynamic or volatile media; and LAN bytes: quantity of data to be transmitted over the network.

As stated above, CAE elements are generic to a particular software application or set of related software applications. Any workload can therefore be characterized using the set of CAE defined for its respective software application. CAE elements are preferably independent of any specific type of hardware or operating system ("OS") software. By making the set of CAE independent of the hardware or operating system, a given workload that has been modeled into CAE elements can thereafter be analyzed against any hardware/OS combination, without requiring further re-characterization of that workload into different sets of CAE elements.

In an alternative embodiment, some of the CAE elements for a workload can be defined to be dependent upon certain hardware or OS components. This may be useful, for example, if it is known that a particular hardware or OS component will absolutely be used to implement the system upon which the software application will reside. This could be employed where the performance characteristics of the components are enhanced by customized interactions between the hardware and OS.

The hardware system to be sized is the computer system or collection of system components upon which the software application will be loaded to perform the workload. The performance of the hardware system is the response of the system to the workload activities, which can be measured in terms of resource utilization and execution times. According to an aspect of the invention, the hardware system is also modeled in terms of the same CAE elements used to model the workload. Since the CAE elements are preferably hardware independent, each different hardware component that is to be analyzed for sizing purposes can be modeled using the same set of CAE elements. At process action 106, CAE data is received for each hardware component to be analyzed by the sizing mechanism of the present invention.

Since the workload and the possible hardware components are modeled in terms of the same CAE elements, an analysis can be made regarding performance levels of the hardware components when operating upon the workload (108). For example, the invention can be used to determine the percentage utilization of a given CPU by a certain workload. If a workload will result in over 100% utilization of a certain CPU, then it is known that multiple such CPUs must be used to operate the workload, or a different CPU must be selected. In addition, the invention can be used to determine response times of a given CPU to a certain workload.

By collecting the CAE-related costs of each subsystem in a hardware system, a profile can be created of the system and how well it executes workloads for a software application. This profile is workload independent, as it is based on the execution of atomic system activities. This profile can be used to predict the hardware system's performance on any workload characterized in the same set of CAE elements.

Performance estimates can also be made for possible hardware components to be used to operate the workload (110). For instance, such performance estimates can be used determine the operating speeds to complete certain workload activities for possible combinations of hardware components. If the estimated performance of a hardware combination is not acceptable, then a different hardware combination is selected. Based upon some or all of these analysis actions, one or more sets of possible hardware system parameters are produced by the sizer mechanism (112).

Workload Definition

As stated above, a workload is a set of actions that is performed by the software application. To perform system sizing according to an embodiment of the invention, workload definition information regarding the anticipated workload is collected from the user to guide the sizing process. This information is referred to herein as the User Focussed Workload ("UFW"). The UFW generally consists of information that is available to the user regarding the anticipated workload, such as the type of the transaction that is being performed or the number of users on the system. The sizing mechanism preferably interacts with the user in terms of the UFW, thereby providing the benefit of allowing users to manipulate abstracted objects in the system model using known information categories. This makes the sizing process more manageable for users, while requiring less specialized knowledge regarding the underlying objects and structures within the system. This becomes very useful as the software application becomes larger, particularly if no single person is familiar with the details of the entire application, and the sizing tool user only posses high level information regarding the application.

The UFW can be collected using forms or templates that are organized by the type of software application being sized and the information regarding the application that is available to the user. For example, when sizing a database server, the collected information can be structured in categories such as applications, users, transactions, and requests. The collected information can be used to derive the corresponding CAEs for the workload. The sizing mechanism of the invention additionally takes the information from the UFW and translates it into a Computer Activity Workload ("CAW"). The CAW represents the workload "data structure" that mathematically describes the workload in terms of CAE elements. In the preferred embodiment, the CAW is represented as CAE/time for all CAE elements comprising the workload. For example, assume that a given workload comprises CAE elements CAE1, CAE2, and CAE3. The CAW for this workload may be expressed as:

$(x1*CAE1)$/hour $(x2*CAE2)$/hour $(x3*CAE3)$/hour

As described in more detail below, the CAW information is used in the sizing model to determine the system cost of the workload.

Alternatively, the workload definition information can be collected from other sources. For example, the workload definition information can be derived from an actual workload that has been traced and stored from a computer system. Workload snapshots can be taken of the system in actual use, by collecting statistics of a systems running a workload using performance tools. The workload snapshots captured while tracing a database can be stored as CAW and used as input for either capacity planning or system sizing. In another embodiment, the workload definition information can be obtained using a combination of sources. Thus, some of the information can be obtained from users, while the rest of the workload definition information is obtained by collecting CAE statistics of a running instance of a workload.

According to an embodiment of the invention when used for modeling a database workload, the workload definition information includes the following qualities: (a) generic to hardware; (b) broken down by transactions and users; (c) includes a time dimension; (d) can be scaled; (e) can be summed; and (f) does not require an excessive amount of information. These qualities allow the workload to be fully defined, while also permitting the workload definition to be transferable to other applications or hardware. Thus, the workload definition that is described for system sizing can be the same workload definition that is used for capacity planning purposes. Likewise, that same workload definition can be used for analysis performed with respect to a plurality of different hardware platforms.

For a database model, the workload definition information is primarily organized as a set of transactions. A transaction is made up of one or more statements executed as a group against the database, all of which share a common commit. The UFW for a transaction-based model utilizes parameters such as the following:

(a) Average Rows Returned: the number of rows that are collected by a transaction;

(b) Rows in Table—the number of rows in the table which the data was collected from;

(c) SQL Type—the type of SQL statement represented by the transaction, e.g., select, update, insert, or delete;

(d) Bytes Returned per Row—the average number of bytes per row of data returned by a SQL statement;

(e) Index Type—the type of index was used by the SQL in finding the relevant data;

(f) Data Distribution—information regarding whether the data being collected is located in a localized area in the database, or whether the data is more distributed;

(g) Sort Type—information regarding whether the data to be selected by the SQL statement is sorted and how;

(h) Rate—the frequency with which the transaction occurs; and (i) Think Time—the amount of time the user is idle during the transaction.

Figure 2:
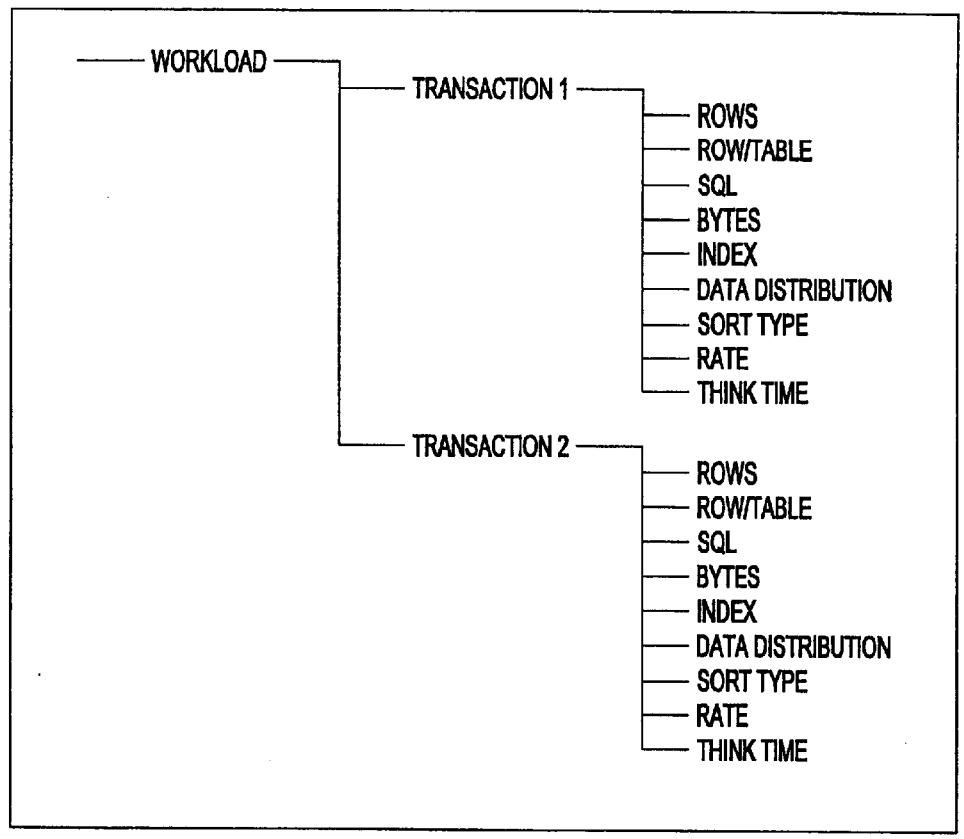
FIG. 2 shows an embodiment of a workload definition model for database workloads.

The relationship among these factors is shown in FIG. 2. Additional and/or different combinations of parameters may also be used to model a transaction according to the invention.

Figure 3:
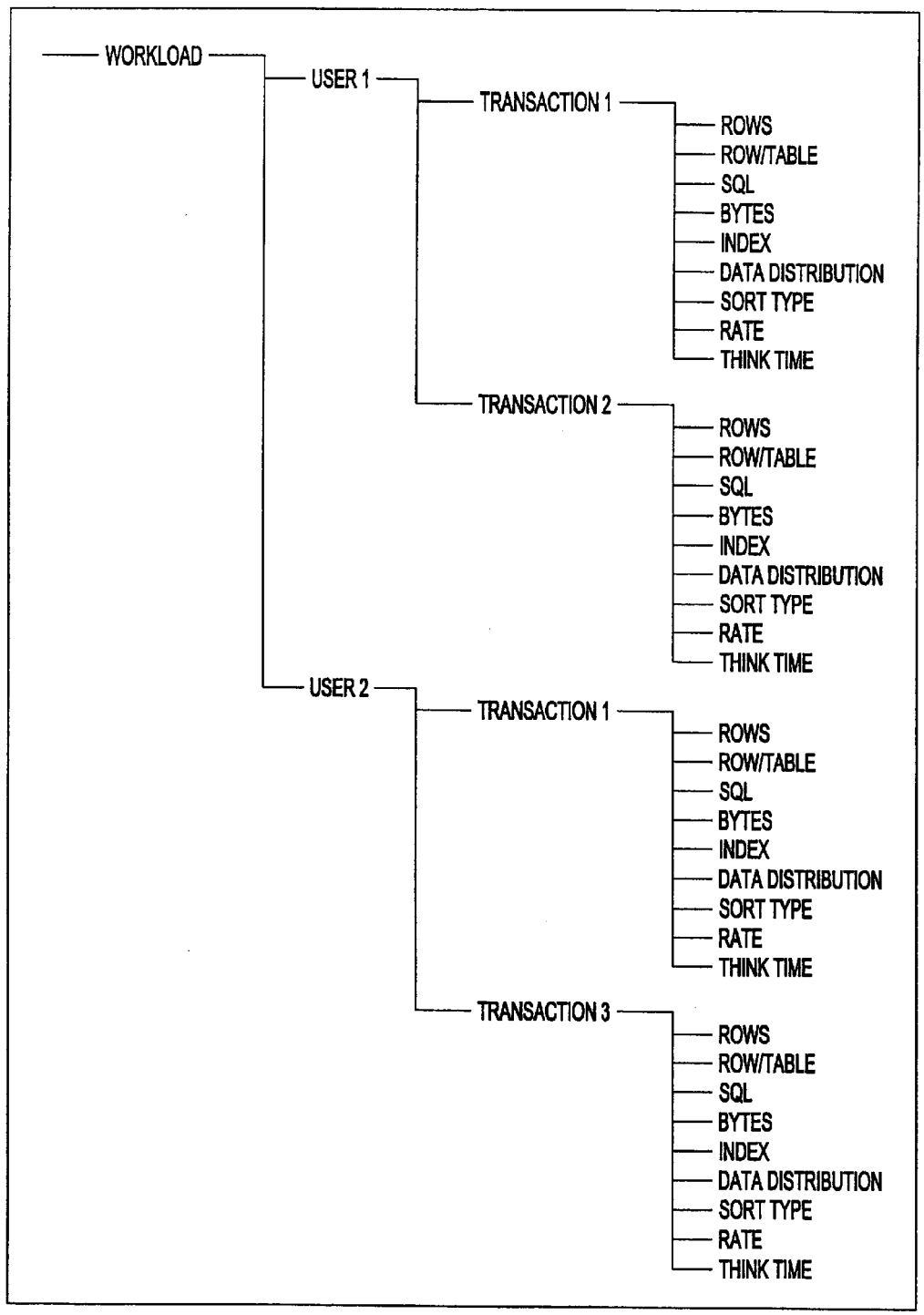
FIG. 3 shows an alternate embodiment of a workload definition model for database workloads.

The workload definition can be further broken down per user. Transactions can be grouped according to the user type that utilizes the transaction. This allows the workload definition to be defined as a function of the users. Moreover, the performance effects of different types of users on the system can be determined. In addition, editing can be performed based on user profiles. This organization adds another level to the hierarchy of the parameters, as shown in FIG. 3. Note that transaction1 is attached to both User 1 and User 2 in the hierarchy of FIG. 3. This represents that a single transaction can be executed by multiple users. However, differences may appear between the two representations of the transaction; for example, the volume of the transactions, as identified by the rate, may be different for each instance of transaction 1.

The above definition of a workload is appropriate for a snapshot of database activity for a period of steady-state operation. In order to capture time variances in activity, sets of workload definitions can be created. For capacity planning purposes, the basis of the calculations may comprise a set of historical data. The historical data can be periodically collected from the database (e.g., using a tracing tool). Alternatively, the data could be user-defined, in which an editing tool is used to define several workloads covering a given time period. Predetermined or "canned" workload definition sets can be utilized which are captured, created or defined as an example or for a specific purpose.

The workload definition can be extended to predict future workload parameters, in which the historical workload definition is edited to provide anticipated or possible workload scenarios (e.g., adding more users). In addition, the historical workload definition can be used to predict future workload definitions using trending techniques.

The workload analysis should take into account "events" and 'trends" that affect the workload. As used herein, "events" refer to localized changes to the workload. "Trends" refer to longer-term changes to the workload that can be considered part of the workload itself. An event can be added to the workload, or even preempt the current workload. According to an embodiment, events are used to model: (a) large-scale activity, e.g., DSS reports, that occurs periodically (daily, monthly, weekly); (b) peak periods of non-standard activity; and (c) other changes to the load which have an effect upon performance. Trends can be described in terms of mathematical functions, and can be used to model: (a) workload growth (e.g., linear or exponential); (b) table growth (e.g., linear, exponential, step function); (c) user growth (e.g., step function); (d) cyclic behavior (e.g., compound sin function); and (e) steady state (e.g., unity function).

Profiling Hardware Systems and Components

An additional aspect of the invention is directed to the profiling of candidate hardware systems. The hardware system comprises the components upon which the software application is executed. The present invention provides a method and mechanism for profiling the hardware system and its various subsystems into a set of generic activity elements.

Similar to the way the workload definition model (at its lowest level) is a collection of time dependent CAEs, the hardware system model (at its lowest level) is a collection of subsystem costs for CAEs. In the preferred embodiment, the parameters of the system model are held in terms of (%SSU/(CAE/time)), where SSU is sub-system unit (e.g., 1 CPU, 1 MB RAM, or 1 disk). Multiplying this by the workload CAW results in the subsystem utilization:

$$CAW*SYS=(CAE/\text{time})*(\%SSU/(CAE/\text{time}))=\%SSU$$

Unlike the software workload, the hardware system has certain physical limitations. There is a finite number of persistent storage (e.g., disk drives) and a finite amount of memory that a system can accommodate. For the purposes of illustration only, and not by way of limitation, the term "disk" or "disk drive" shall be used throughout this document in place of the term "persistent storage." In addition, there may be a range of alternate systems that are available to perform the same task, with each having different performance characteristics. The present invention provides a mechanism that allows the system to be described both in terms of what components it actually contains, but also in terms of all of the components it could possibly have. This allows the system to be scaled to address different workload needs, but also provides an indication if the system can no longer be scaled. This provides the distinction between situations where more hardware can be added to a system and where a whole new system is needed for more capacity.

Systems can be associated into system families. This is useful when addressing symmetric multi-processor systems ("SMP") and clustered systems. In real-world situations, increasing processor capacity in a system does not always result in a linear growth in processor performance. Therefore, for the SMP situation, one or more scaling functions can be used to describe the increase in processing power as more processors are added. When clustering is added to the system, the scalability function becomes more complex. The function used to describe system scalability changes from a curve to a two dimensional surface. Thus, the scalability from a one CPU system becomes a function of both the number of nodes and the number of CPUs at each node.

In addition to the scalability function, there can be an optimal configuration rule associated with a system. This configuration rule determines the optimal configuration based upon specific needs of the system. For example, the performance needs of the system will determine whether a one node system having 50 CPUs is more appropriate than a two node system having 25 CPUs at each node.

According to an embodiment, the hardware system model comprises five major sub-systems: (1) Processor; (2) Persistent Storage (e.g., disk drives); (3) Dynamic Storage (e.g., memory); (4) Network; and (5) Interconnect (e.g., system bus). Profiles of these subsystem components are used in the sizer mechanism to predict the performance of a hardware system for a given workload.

According to an embodiment of the invention, a description of the processor subsystem model includes the following parameters: (a) subsystem unit ("SSU), which is preferably defined as 1 CPU; (b) number of SSUs in the system; (c) maximum number of SSUs; (d) physical parameters; and (e) logical parameters. The physical parameters can be represented using the following costs:

random physical read cost=%CPU/(random physical read/second);

sequential physical read cost %CPU/(sequential physical read/second);

random physical write cost=%CPU/(random physical write/second);

sequential physical write cost %CPU/(sequential physical write/second).

The logical parameters can be represented using the following costs:

random logical read cost=%CPU/(random logical read/second);

sequential logical read cost=%CPU/(sequential logical read/second);

random logical write cost=%CPU/(random logical write/second);

sequential logical write cost=%CPU/(sequential logical write/second);

utilization curve.

According to an embodiment, a description of the persistent storage subsystem model includes the following parameters: (a) subsystem unit ("SSU"), which is preferably defined as 1 Disk; (b) number of SSUs; (c) maximum number of SSUs; (d) disk size; and, (e) physical parameters. The physical parameters can be represented using the following costs:

random physical read cost=%Disk/(random physical read/second);

sequential physical read cost=%Disk/(sequential physical read/second);

random physical write cost=%Disk/(random physical write/second);

sequential physical write cost=%Disk/(sequential physical write/second).

According to an embodiment, a description of the dynamic/volatile storage subsystem model includes the following parameters: (a) subsystem unit ("SSU"), which is preferably set at 1 MB RAM; (b) number of SSUs; (c) maximum number of SSUs; (d) memory per user; (e) database memory (i.e., what is required for database to reside in memory); (f) system memory; and, (g) database system global area memory (e.g., the "SGA" for an Oracle 8 database available from Oracle Corporation of Redwood Shores, Calif.). The database system global area parameters can be represented using the following elements:

Processes;

DB block buffers/DB block size;

Shared pool size;

Log buffer;

DML locks;

Sequence Cache (entries and hash buckets); and

Multi-block read count.

The hardware system profiles can be collected into system-sets in a similar fashion to the collection of workload definitions into workload definition sets. These system sets add a time dimension to the system configurations. The performance at any point is a function of the workload and the configuration of the system as of that time. Similar to the workload definition, the basic system set can comprise a set of historical data. This historical data could be collected periodically from the system, using a hardware/OS specific tuning and collection tools. Alternatively, the system set can be user defined, in which a user defines the system configurations and the changes over time. In addition, the system sets can be pre-determined, based upon a selection of standard hardware setups, possibly supplied from the makers or vendors of the hardware components.

As with the workload, the historical data for systems can be extended into the future. The set of system data combines historical data with predicted data that encompasses both the past and the future. According to an embodiment, there are at least two ways to extend the workload. First, the historical workload can be used to predict the future workload using trending techniques. Second, predicted system configurations can be created by editing the system sets.

There is an almost infinite number of combinations of system makes, models, and configurations. Therefore, in order to confine the search for appropriate systems and configurations, one or more discrete sets of available systems is compiled from which the model chooses possible options. A set of systems and system families is called a system pool. For example, a particular system pool might consist of all of the current models offered by a manufacturer. According to an embodiment, the contents of a system pool is not static, but can be updated and edited. This allows the set of systems in the system pool to be updated. In addition, this permits matching of the systems available to the model to the systems being sized, and offers the flexibility to mix and match available systems. Moreover, this allows the sizer mechanism to confine its search to relevant hardware/OS configurations.

Deriving System Parametric Data

The present invention provides a method and mechanism for determining the cost of basic system operations during the execution of software statements. This information is used to generate models that are based upon basic system operations, such as reading a page from disk or writing a page to buffer. In the present invention, the unit costs of the generic CAEs are collected into a system profile that can be used to size a system.

According to an embodiment, command executions of programming statements can be used to determine the cost of basic system operations. For database activity, database statements, such as structured query language ("SQL") statements, are used to determine the cost of database activity in the system. For purposes of illustration only, the following description shall be made in the context of SQL statements.

Figure 4:
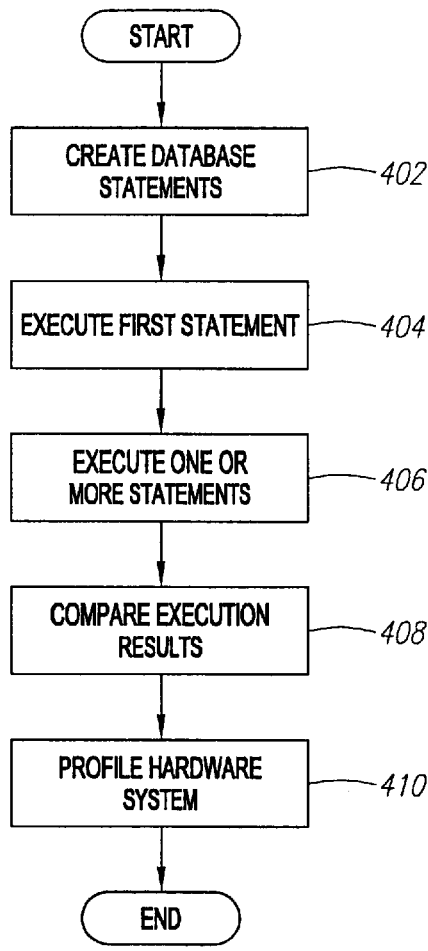
FIG. 4 depicts a process flow for profiling hardware systems according to an embodiment of the invention.

FIG. 4 depicts the high-level process flow for an embodiment of the invention. The first action is to determine what system activity is to be measured. These system activities correspond to the CAE elements in which the workload is modeled. For example, such system activities includes reading from memory, reading from disk, writing to memory, writing to disk, and writing to a log file.

A plurality of SQL statements are created which perform at least the system activity of interest (402). These SQL statements may also perform other operations that do not involve the system activity of interest. A first SQL statement may perform one or more operations involving the system activity of interest. A second SQL statement may also perform one or more operations involving the system activity of interest, but the statements are configured such that the number of operations performed by the second statement is different than the number of operations performed by the first statement. Additional SQL statements may also be created in which the number of operations of the system activity of interest is different from either the first or second statement.

The first database statement is then executed, and the cost recorded (404). In one embodiment, the recorded cost comprises the elapsed time of execution for the statement. In addition, the number of executions of certain system activities is measured, e.g., by a performance monitoring tool. The second database statement is thereafter executed, and its cost and system activities are also recorded (406). The cost recordation of the executions of the two database statements can be compared to determine the cost of the particular system activity of interest (408). Based upon the result of the comparison, the cost associated with the system activity that was measured can be added to the system profile (410).

For example, consider the process to measure the cost of accessing a data page from memory. For purposes of this example, assume that there is an index on a column "name_col" and that all indexes and data pages for this column are in memory. The following is an example of a first database statement that can be used:

SELECT COUNT(*) FROM Table1 WHERE name_col='John Doe'

This SQL statement performs the aggregate function COUNT to count all rows in the table "Table1" in which the value of the column "name_col" is equal to 'John Doe'.

The following is an example of a second database statement that can be used:

SELECT*FROM Table1 WHERE name_col='John Doe'

This SQL statement retrieves all rows from Table1 in which the value of the name_col column is equal to 'John Doe'.

The difference between the two statements is the second statement will actually access memory to retrieve a data page, while the first statement stops at an index access due to the aggregate function COUNT. To measure the cost of the system activity of interest (i.e., accessing a data page from memory), each of these statements are executed and the costs and system activities are recorded.

The following is a possible example of the cost (measured in time) and system activities that are recorded for executing the first statement:

Time1=(0*$CAE1$)+(10*$CAE2$)+(20*$CAE3$)

CAE1 represents the system activity of accessing a data page from memory. As shown in this cost equation, the system activity CAE1 is performed zero times by this statement (because the statement stops at an index access, as stated above). CAE2 and CAE3 represent other system activities performed by the first statement when it is executed.

The following is a possible example of the cost and system activities that are recorded for executing the second statement:

Time2=(1*$CAE1$)+(10*$CAE2$)+(20*$CAE3$)

As shown in this cost equation, the system activity CAE1 is performed once by executing the second statement. The number of times the system activities CAE2 and CAE3 are performed is identical to the number recorded for the execution of the first statement.

The cost recordations of the two statements can be compared to derive the cost of the system activity of interest. For this example, the difference between the two costs is approximately the access of a data page in memory (i.e., the system activity represented by CAE1).

Time2=(1*$CAE1$)+(10*$CAE2$)+(20*$CAE3$)

Time1=(0*$CAE1$)+(10*$CAE2$)+(20*$CAE3$)

Time2−Time1=(1*$CAE1$)+(0*$CAE2$)+(0*$CAE3$)=$CAE1$

To evaluate the cost of reading a page from disk, the same two statements can be used, except that the system is configured such that all index pages are in memory while the data pages are on disk.

The cost of writing to memory can be derived by two insert statements, in which one statement inserts a row into a table with one index, while the other statement inserts a row into a table with two indexes. Since the difference between the two insert statements is one index write, the cost difference is approximately the cost of writing one record to memory. Performance analysis can be used to make sure that the difference is actually a single logical write.

In a similar fashion, additional database statements can be used to evaluate the cost of other system activities. These additional statements are structured to focus upon the systems activity of interest.

Note that multiple sets of SQL statements can be used to derive the desired cost of basic system operations. In addition, more than two SQL statements can be executed and compared to calculate the cost of a system activity.

According to one embodiment of the invention, each database statement is executed and monitored many times, and the results are averaged together prior to any comparisons with other database statements. In this manner, the effects of transitory system differences upon the measured cost for executing the database statement are averaged out over the course of testing for that particular statement. In some cases, a database statement may be executed several thousand times, with the results averaged together prior to any comparisons with the measured results of other database statements, each of which is also the result of multiple executions that have been averaged together.

Any numeric or computational method for solving simultaneous equations can be used in the invention. For example, another approach to deriving system parametric data is to use a matrix to count the number of executions of the basic system operations. Consider the following cost equations for the execution of three SQL statements:

(3*$CAE1$)+(2*$CAE2$)+(overhead)=cost_1

(1*$CAE1$)+(3*$CAE2$)+(overhead)=cost_2

(2*$CAE1$)+(1*$CAE2$)+(overhead)=cost_3

Linear programming methods can be used to solve the cost of each basic system operation. Using linear programming methods, the cost of each system operation can be solved without having to perform numerous individual comparisons between two statements that differ by only a single system activity.

Profiling of a hardware system can be implemented using testing "kits", which are comprised of a set of programs that run a set of software test cases on the hardware system. To profile a hardware system into a set of database CAE elements, the test kit includes a test workload and a predefined database test with randomly generated data that is loaded onto the system.

Clients are set up, and the execution of the workload can be synchronized between the server and the client. User access is simulated by executing test transactions defined in workload templates or scripts. It is preferred that multiple clients are implemented and multiple simultaneous workloads are executed to simulate real-world loading conditions on the hardware systems. System statistics and performance parameters are collected during testing to establish the profile of the hardware system.

The following are actions that are taken to create a profile of a hardware system:

(a) Set up the hardware system;

(b) Load test database including an appropriate amount of data to emulate standard database operations;

(c) Determine relative power of the hardware system to be tested in order to scale workload to the system;

(d) Create a set of workloads on the server, using sufficient number of users to adequately simulate "standard" database operation. The set of workloads include test cases to isolate fundamental database activities, as well as test cases that combine multiple fundamental activities.

(e) Measure cost for workload activity; and (f) Use results of measurements to calculate profile of system.

An embodiment of the invention includes an autoscaling feature within the test kit. The autoscaling feature scales the workload to the capacity of components in the system, such as the CPU or disk capacity of the system under test. The autoscaling can be performed independent for each component, and is not dependent upon any relationship between the various components.

Autoscaling the CPU scaling factor is the process to find the proper scaling factor to scale the system under test to appropriate CPU utilization levels. These utilization levels determine how the system under test scales when system activities increase. In an embodiment, 70% CPU utilization is the target utilization for autoscaling since 70% CPU utilization is considered peak utilization performance on many server machines. The test kit components, test clients, and simulated workloads are coordinated to drive the system to this target utilization.

To autoscale the CPU, an initial scaling factor is selected. A warm-up test is run to prepare the system for steady-state operation. A preselected test case is run that is scaled to the initial scaling factor. Several system performance and utilization levels are measured during this run, including system, database, and workload utilization levels. The workload level can be varied to search for the optimal CPU utilization level for testing.

In an embodiment, a starting factor of "1" is selected for the initial CPU scaling factor. This initial scaling factor is multiplied by "24" to produce 24 test processes or clients. These test processes execute transactions against the system under test. The CPU utilization of the system is recorded as each test process completes its transaction. A two-dimensional graph of a line using (0,0) as the first point and (24, CPU utilization) as the second point, in which a point is described as (x,y) where x is one dimension and y is the second.

The number of test processes for the next autoscaling iteration uses this line's slope and data gathered during current and previous iterations. The number of test processes is extracted from the formula "x=((y−c)/a)+b" where: "x" is new number of processes for next iteration; "a" is the slope of the newly formed line; slope is computed by (x1−x2)/(y1−y2) where x1 is current iteration users and x2 is previous users, and y1 is current CPU utilization and y2 is previous CPU utilization; "y" is 70% (target utilization); for first iteration, x2 and y2 are "0.0"; "c" is CPU utilization obtained in the current iteration; and "b" is the number of test processes used in the current iteration.

The new number of test processes is spawned to perform the next iteration of running transactions against the system under test. Additional iterations are repeated until the number of processes that is running against the system under test produce an approximate CPU utilization of 70% (e.g., within a 2% error band of 70% (68%–72%)). When this utilization level is achieved, the autoscaling process is complete.

The process for autoscaling the disk factor is similar to the process for autoscaling the CPU factor. To scale the disks, the test kit first runs a warm-up test to prepare the system for steady-state operation. The test kit then runs a pre-selected test case scaled to the initial scaling factor and measures several utilization and performance parameters, such as system, database, and workload utilization levels. The workload level is varied to search for the optimal disk utilization level for testing.

Similar to the process for autoscaling the CPU factor, the process for autoscaling the disk follows a loop model for processing and a linear mathematical model for finding the target value. In an embodiment, the target value is transaction miss ratio. Autoscaling for the disk factor finds the factor to produce the correct number of test processes to run transactions against the server that is able to saturate the I/O (disk drives). Saturation is achieved when the disk drives cannot adequately handle I/O requests and test processes produce transaction misses due to the required number of transactions not completing during an autoscaling iteration. The transaction miss ratio is created by dividing transaction misses by total transactions required to complete by all processes. The target transaction miss ratio can be adjusted depending upon the desired performance characteristics (this ratio is set between 40% and 20% in the preferred embodiment).

As mentioned, autoscaling for disk factor determines the number of test processes the same way Autoscaling for CPU does. A two-dimensional graph is formed of a line for the first iteration of test process. For additional iterations, the number of processes is extracted from the formula "x=((y−c)/a)+b" where: "x" is new number of processes for next iteration; "a" is the slope of the newly formed line; slope is computed by (x1−x2)/(y1−y2) where x1 is current iteration users and x2 is previous users, and y1 is current transaction miss ratio and y2 is previous transaction miss ratio; "y" is 40% (target transaction miss ratio); for first iteration, x2 and y2 are "0.0"; "c" is transaction miss ratio is obtained by all the processes in the current iteration and "b" is processes used in current iteration.

One advantage of the present approach is that system activities can be measured which correspond to basic operations of a specific software application or set of software applications, rather than being tied to a specific set of hardware. As shown in the example above, hardware parametric data can be derived which correspond to basic database activities in the system. These system activities are generic to the software application, and thus are not dependent upon a specific hardware platform. Therefore, each different type of hardware can be profiled according to the same set of system activities. This permits the use of the sizing mechanism in environments under different workloads on multiple hardware platforms. In other words, the workload can be modeled once, and used to sized any hardware platforms that were profiled using the same set of CAE elements.

The invention provides an estimate of the combined effect of software and hardware in a database environment. This presents a significant advantage over other approaches that only measure pure hardware performance characteristics, such as component benchmarks, since these approaches do not take into consideration the particular operations to be performed by the software application. In addition, the invention provides advantages over other approaches that only measure application specific performance characteristics, such as path length or instruction counting measurements to determine the cost of operations by a database engine. The present invention provides an advantage since this application specific approach does not take into account the costs of other components in the atomic action of the database operation with respect to the overall elapsed time of a transaction or application. The present invention is generic, and can be applied to different software applications on different hardware platforms.

Environment

In addition to the workload definition and the system profile, the anticipated operating "environment" is used in determining the appropriate system size for a software application. An example of an operating environment parameter/setting that affects system performance is data mirroring, in which system data is mirrored at two or more physical locations in the system. With data mirroring, every disk write operation for a data item results in multiple such operations being performed with the exact number of write operations corresponding to the mirroring factor employed for that data item. Such environmental parameters are analyzed along with the workload to determine the effects of software activity on the hardware system.

The environment parameters are typically (but not always) independent of the workload and system configuration. Thus, the software application or physical hardware system can be set up to reflect different operating environments. In the preferred embodiment, the units of the environment parameters are mathematically different from the units of the system profiles or workload definitions. The environment parameters are unitless multipliers, whereas the hardware subsystem profiles are represented in terms of (%SSU/(CAE/time)).

When sizing a database server, the operating settings of the database software is included in the environment parameters to be collected and analyzed. These environment parameters are indicative of the actual implementation of the database workload, and such parameters may be different between systems and will therefore affect the system model differently. The following are examples of environmental parameters used in an embodiment of the invention: (a) cache hit ratio—used to determine the distribution between physical and logical read operations in the system; (b) percent free space in database tables—used to determine unused space in data blocks, which provides an indication of the number of records that can be read in one block read; and (c) RAID or mirroring level—used to determine the actual number of physical write operations that correspond to each requested physical write.

System Performance and Predicted Performance

There are at least two main issues in determining the performance of a system for system sizing and capacity planning. The first issue is whether the system has a bottleneck to performance. The second issue is whether the predicted response is satisfactory to meet the system's specifications. The process of system sizing and capacity planning can be used to predict whether the system will fall prey to one of these conditions.

The system performance is measured by a set of parameters corresponding to database response and system utilization levels. These parameters are used to determine whether the system has a bottleneck and/or if the response is satisfactory to meet the system specifications. The following are examples of parameters that can be used to gauge the performance of the system: (a) processor utilization; (b) disk utilization; (c) memory utilization; (d) network utilization (e.g., packet rate or connections); (e) required throughout; (f) system capacity/reserve capacity; (g) system queue; (h) response time (e.g., maximum or average); and (i) service time.

Processor utilization can be further represented into more specific parameters such as: (a) OS overhead; (b) physical I/O (e.g., sequential or random); (c) I/O logical (e.g., sequential or random); (d) computation time; and (e) database (or application) overhead time.

Disk utilization can be further represented into more specific parameters such as: (a) Disk I/O rates (e.g., per partition, per spindle, sequential, and/or random); and (b) Log I/O rates.

Memory utilization can be further represented into more specific parameters such as: (a) user memory; (b) OS memory; (c) system global area memory for a database; and (d) process memory.

Multiple sets of performance parameters can be organized into performance sets. Performance sets are the same as workload sets, but they add the dimension of time to the performance parameters. Performance sets are a result of a calculation and therefore cannot be operated upon. In order to change the performance set, the underlying workload set and system set must be changed and the model re-calculated.

System Sizer Model

Figure 5:
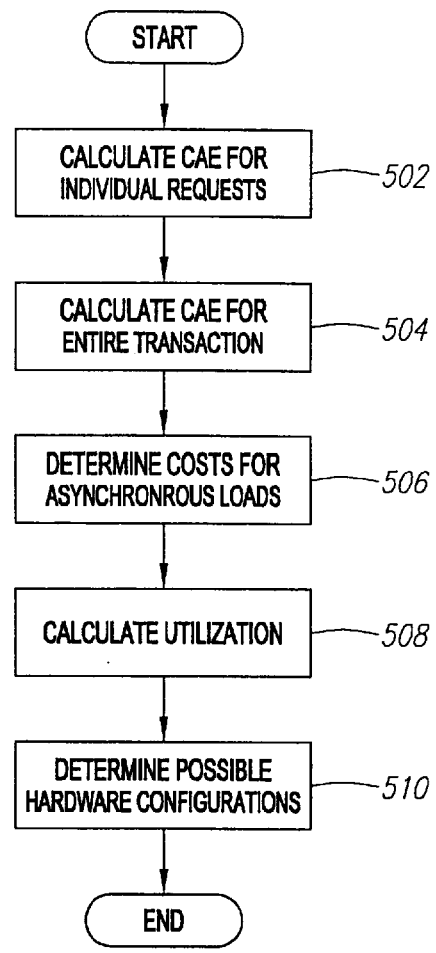
FIG. 5 depicts a process flow for sizing a database system according to an embodiment of the invention.

FIG. 5 depicts a process flow for sizing a database server according to an embodiment of the invention. Initially, a workload definition is received for the workload for which system sizing is required. Based upon the workload definition, individual requests within the workload are characterized into sets of CAE elements (502). The entire transaction is then characterized into CAE elements based upon the characterizations of the individual requests that make up the transaction (504). Asynchronous loads within the workload are thereafter characterized into additional CAE elements which affect the system. The sum of the CAE elements is the generic representation of the workload for the model (506). Using profiles that have already been obtained for candidate hardware systems, utilization levels are calculated with respect to some or all of the candidate hardware systems (508). Based upon these utilization calculations, one or more possible hardware configurations are suggested (510). Performance analysis can also be conducted to indicate the performance levels of the possible systems.

The analysis is performed for each subsystem component in the system. The hardware subsystem profile is represented in the following units:

$$HW\ profile = (\%SSU/(CAE/time))$$

where "%SSU" represents the percent utilization of a subsystem unit.

The workload definition, expressed as the computing activity workload ("CAW"), is represented in the following units:

$$CAW = CAE/time$$

The system utilization can therefore be calculated as follows:

$$CAW*HW\ profile = (CAE/time)*(\%\ SSU/(CAE/time)) = \%\ SSU$$

As used in these equations, the percent utilization of a subsystem unit is expressed as the (busy time of SSU)/time. Thus, the system cost can be calculated as:

$$System\ cost = \frac{\%\ SSU}{CAW} = \frac{busytime/time}{CAE/time} = \frac{Busytime}{CAE}$$

Which represents the busy time of the system per computing activity element.

The following are illustrative examples of pseudocode that can be used to implement an embodiment of the present invention for sizing database servers. The disclosed pseudocode is suitable for a number of database implementations, but the present description contains defaults values for certain variable that are particularly suitable when used in conjunction with the Oracle 8 database, available from Oracle Corporation of Redwood Shores, Calif. Note that while the disclosed example is directed to sizing a database server, the principles shown herein can easily be applied to size other types of systems, such as application servers that work in conjunction with database servers or computer systems addressed to other types of software applications.

Database Tables

Database table information is input to the sizer mechanism so that the effects of table size on the performance of the system can be modeled. The table parameters can be edited on a global scale, so that the table size can be changed and the resulting change is applied to analyze this change to each transaction. The table information, e.g., table size information, is used to determine index information, such as the number of root and branch levels in indexes, number of indexes per page, and the size of indexes for disk sizing. The table information is also used to determine memory information, such as the size of indexes that must be kept in memory, predicted cache hit ratios, and the size of the buffer cache for frequently accessed data. In addition, the table information can be used to determine disk information, since table sizes, index sizes, and cache hit ratio figures are used to size disks. This information can also be used to determine the required sort space on disk.

The following table information values are utilized in an embodiment of the sizer model of the present invention. Note that comments are enclosed by the "/*" and "*/" symbols:

table_rows_size /* size of table rows */
    table_size /* size of table */
    table_index_size /* size of table index */
    table_data_per_page /* amount of data per page of table */
    table_index_per_page /* number of indexes per page of table */
    table_root_branch_levels /* number of levels in an index tree */
    table_prob_data_random /* probability of randomness to table. If table is sorted, probability is zero. */

Individual Database Statement Requests

This section is used to generate the set of CAE for individual database statement requests. According to an embodiment, each request comprises a single SQL command. Transactions are made up of one or more requests that share a common commit. The following are input information for the workload that are passed to the sizer mechanism of the invention:

req_#-_rows[j] /* Average number of rows that the request will touch. An array of size j with an entry for each table joined. */ req_#-_table_rows[j] /* Number of rows in the table that the request touches. Can also be used to represent the number of rows in the requested table. This variable is an array of size j with an entry for each table joined. This can be implemented as a look up value. */ req_table_name[j] /* Name of the table that the request touches An array of size j with an entry for each table joined. Use of this information is optional in an embodiment of the invention. */ req_row_len[j] /* Width of the row in bytes. Can also be average row size. An array of size j with an entry for each table joined. This may be a look up value in some cases. Use of this information is optional in an embodiment, and default values can also be employed. */ req_#-_columns[j] /* Number of columns in the table. An array of sizej with an entry for each table joined. This may be a look up value in some cases. Use of this information is optional in an embodiment, and default values can also be employed. */ req_SQL_action_type: /* Action performed by SQL statement. (0=select, 1=update, 2=insert, 3=delete) */ req_return_type /* Return type for the SQL statement. (0=summary, 1=fields, 2=row) Summary is for statements like 'select count(*) . . . ' Row is for 'select* . . . ' Fields is for 'select a, b,c . . . '*/ req_return_bytes[j] /* Average number of bytes in a returned row, or the bytes returned in a summary. This may be a calculated value in some cases. Use of this information is optional in an embodiment, and default values can also be employed. */ req_index_type[j] /* Index type, selected from these categories: (0=primary, 1=secondary, 2=foreign, 3=none). An array of size j with an entry for each table joined. This may be a look up value in some cases */ req_index_name[j] /* Name of the index used An array of size j with an entry for each table joined. Use of this information is optional in an embodiment, and default values can also be employed. */ req_sort_type /* Sort type. (0=none, 1=ascending, 2=decending) */ req_sort_columns: /* Number of columns used in group by statement. This information can be optional when data is to be sorted. */ req_sort_group_by: /* Whether SQL statement has "GROUP BY" clause: (1=yes, 1=no). This information can be optional when data is to be sorted. */ req_primary_indexes[j] /* Primary indexes to be accessed by the SQL statement. An array of size j with an entry for each table joined. */ req_secondary_indexes[j] /* Secondary indexes to be accessed by the SQL statement. An array of size j with an entry for each table joined. */ req_index_row_len[j]: /* Row size for indexes. An array of size j with an entry for each table joined. */ prob_data_random[j]: /* Probability that data is randomly stored in table. An array of size j with an entry for each table joined. */ prob_index_random[j]: /* Probability that index is randomly stored. Also referred to as "clustering ration." An array of size j with an entry for each table joined. */

The following are environmental information that is provided as input to the sizer mechanism:
   min_seq_block_set /* minimum number of blocks needed for a sequential read. */
   page_size /* database block size in bytes */
   multiblock_read_count /* The # of blocks to be read in one chunk during full table scans. */
The following represent system data that is provided as input to the sizer mechanism:
   pctfree* /* This is the percent free space reserved on each data page or block. According to an embodiment, 10% can be used as a default value. */
   #_row_cols[ ]* /* Average number of columns defined for each row. */
   #_ind_cols[ ]* /* Average number of columns defined for each index. According to an embodiment, the default value is 2 columns<=127 bytes or 1 column>127 bytes. */
   db_block_header_size* /* Header size for each data page or block. According to an embodiment, the default value is 130 bytes. This value can be derived as a function of the columns. */
   db_block_row_overhead* /* Overhead associated with each page or block. According to an embodiment, the default value is 7 bytes, assuming each row has 4 cols of size 250 bytes or less and 1 col of size greater than 250 bytes. */
   index_block_header_size* /* Header size for each page or block associated with index. According to an embodiment, the default value is 160 bytes. This information can be derived as a function of indexed row length. */
   index_block_row_overhead*: /* Overhead for page or block associated with index. According to an embodiment, the default value is 10 bytes if each row has 2 indexed col<=127 bytes or 1 indexed col>127 bytes. */
The following represents pseudocode to establish certain default values for the workload:
   /* Set number of primary indexes */
   if rep_primary_indexes
       primary_indexes=req_primary_indexes
   else
       primary_indexes=[default value]
   /* The default value is 15 bytes in an embodiment of the invention. */
   /* Set number of secondary indexes */
   if req_secondary_indexes
       secondary_indexes=req_secondary_indexes
   else
       secondary_indexes=[default value]
   /* The default value is set to "1" in an embodiment of the invention */
   /* Set probability of random index access */
   if prob_index_random not set
       prob_index_random=[default value]
   /* The default value is set to "0" in an embodiment of the invention */
   /* Set size of index row */
   if req_index_row_len not set
       req_index_row_len=[default value]
   /* The default value is set to "0.25" in an embodiment of the invention. */
   /* Set size of table row */
   if req_row_len not set
       req_row_len=[default value]
   /* The default value is set to 30 bytes in an embodiment of the invention. */
   /* Set number of root branch levels */
   if root_branch_levels not set:
       root_branch_levels=[default value]
   /* The default value is set to "2" in an embodiment of the invention. For capacity planning, instead of using a default value of 2, the value of 1.5 is preferably used (# of non-null rows in table). */
The following pseudocode is used to calculate certain intermediate values used to derive CAE values:
   /* Calculate number of indexes per page */
   index_per_page=[(page_size−index_block_header_size)*(1−pctfree/100)]/(req_index_row_len+index_block_row_overhead)
   /*Calculate number of index pages */
   index_pages[ ]=req_#-table_rows/(index_per_page*index_cluster_ratio)
   /* Calculate amount of data per page */
   data_per_page=[page_size−db_block_header_size−(floor(page_size*pctfree/100)]/(req_row_len+db_block_row_overhead)
   /* Calculate number of data pages */
   data_pages=req_#-_table_rows/data_per_page
   /* A "data_page" is equal to a "db_block", which is an Oracle data block in an Oracle 8 datbase system. */
   /* Calculate number of table indexes */
   table_indexes=primary_indexes+secondary_indexes
   /* Calculate probability that index points to different blocks or pages. The primary index is preferably sequential, which would result in a randomness probability of zero */
   if primary index
       Px_rand=prob_index_random
   elseif secondary index
       Px_rand=prob_index_random
   elseif no index
       Px_rand=0
   /* Calculate probability that data is randomly distributed in database */
   if primary index
       Pd_rand=prob_data_random
   elseif secondary index
       Pd_rand=prob_index_random
   elseif no index
       Pd_rand=0
   /* Calculate probability of sequential organization of index */
   Px_seq=1−Px_rand
   /* Set Pd_seq and Pd_rand based upon whether full table scan is being performed */
   if full tbl scan
       Pd_seq=1
       Pd_rand=0
   else
       Pd_seq=1−Pd_rand
   /* Calculate number of rows to read based upon whether index is being accessed */

```
if primary index
    read_rows=req_#-_rows
elseif secondary index
    read_rows=req_#-_rows
elseif no index
    read_rows=req_#-_table_rows
/* Calculate number of root branch reads based upon type
   of operation performed by SQL statement (If B-trees
   are used) */
if select or update
    root_branch_reads=root_branch_levels*primary_
        indexes
elseif insert
    root_branch_reads=root_branch_levels*table_
        indexes
elseif delete
    root_branch_reads=root_branch_levels*table_
        indexes
/* Calculate number of sequential leaf reads based upon
   type of operation performed by SQL statement (if
   B-trees are used) */
if select or update
    leaf_reads_seq=read_rows/index_per_
        page*primary_indexes
elseif insert
    leaf_reads_seq=read_rows/index_per_
        page*secondary_indexes
elseif delete
    leaf_reads_seq=(read_rows/index_per_page)
        *table_indexes
/* Calculate number of random leaf reads based upon type
   of operation performed by SQL statement (if B-trees
   are used) */
if select or update
    leaf_reads_rand=MIN(read_rows, index_pages)
        *primary_indexes
elseif insert
    leaf_reads_rand=primary_indexes+MIN(read_
        rows, index_pages)*secondary_indexes
elseif delete
    leaf_reads_rand=MIN(read_rows, index_pages)
        *table_indexes
/* Calculate number of sequential data reads based upon
   type of operation performed by SQL statement */
if select or update
    data_reads_seq=read_rows/data_per_page
elseif insert
    data_reads_seq=0
elseif delete
    data_reads_seq=(read_rows/data_per_page)
/* Calculate number of random data reads based upon
   type of operation performed by SQL statement */
if select or update
    data_reads_rand=MIN(read_rows, data_pages)
elseif insert
    data_reads_rand=1
elseif delete
    data_reads_rand=MIN(read_rows, data_pages)
/* Calculate number of sequential index writes based
   upon type of operation performed by SQL statement */
if select or update
    index_writes_seq=0
elseif insert
    index_writes_seq=(req_#-_rows/index_per_page)
        *secondary_indexes
elseif delete
    index_writes_seq=(req_#-_rows/index_per_page)
        *table_indexes
/* Calculate number of random index writes based upon
   type of operation performed by SQL statement */
if select or update
    index_writes_rand=0
elseif insert
    index_writes_rand=MIN(req_#-_rows, index_
        pages)*secondary_indexes
elseif delete
    index_writes_rand=MIN(req_#-_rows, index_
        pages)*table_indexes
/* Calculate number of sequential data writes based upon
   type of operation performed by SQL statement */
if select
    data_writes_seq=0
elseif update
    data_writes_seq=(req_#-_rows/data_per_page)
elseif insert
    data_writes_seq=(req_#-_rows/data_per_page)
elseif delete
    data_writes_seq=(req_#-_rows/data_per_page)
/* Calculate number of random data writes based upon
   type of operation performed by SQL statement */
if select
    data_writes_rand=0
elseif update
    data_writes_rand=MIN(req_#-_rows, data_pages)
elseif insert
    data_writes_rand=0
elseif delete
    data_writes_rand=MIN(req_#-_rows, data_pages)
```

The following pseudocode calculates CAE values for the individual request based upon the previously calculated intermediate values:

```
/* Calculate sequential physical reads. Note that Pmiss+
   Phit=1 where Pmiss is probability of data not being
   present in buffer, while Phit is the probability of data
   being found in buffer. Phit and/or Pmiss can be envi-
   ronmental parameters set by users. */
req_phys_reads_seq[ ]=(leaf_reads_seq*Px_seq+
    data_reads_seq*Pd_seq)*Pmiss
/* Calculate random physical reads */
req_phys_reads_rand[ ]=(leaf_reads_rand*Px_rand+
    data_reads_rand*Pd_rand)*Pmiss
/* Make adjustments to values based upon previous
   calculations. For a batch of sequential I/Os, the first I/O
   operation is considered random I/O. */
if req_phys_reads_seq[ ]>0
    req_phys_reads_rand[ ]=req_phys_reads_rand[
        ]+1
    req_phys_reads_seq[ ]=req_phys_reads_seq[ ]-1
/* Calculate logical reads */
req_of_logical_reads[ ]=root_branch_reads+(leaf_
    reads_seq*Px_seq+data_reads_seq*Pd_seq)*Phit+
    (leaf_reads_rand*Px_rand+data_reads_rand*Pd_
    rand)*Phit
/* Calculates logical writes */
``` req_writes[ ]=index_writes_seq*Px_seq+index_writes_rand*Px_rand+data_writes_seq*Pd seq+data_writes_rand*Pd_rand /*Calculates network usage */
req_LAN_bytes[ ]=req_#-_rows*req_return_bytes

Transactions

This section characterizes the entire transaction into a set of CAE elements. According to an embodiment, transactions are made up of one or more individual requests sharing a common commit. The transaction mix can be altered by changing the setting for number of transactions, the frequency, or the percentage mix for each transaction type. Once the set of CAE elements for a transaction has been calculated, the utilization values for a given set of hardware components is computed. The embodiment described herein assumes that a batch database write process ("DBWR") and a batch log write process ("LGWR"), or similar batch write mechanisms, are employed in the database.

The following are workload and environmental inputs used to calculate the set of CAE for a transaction:

trans_frequency /* the frequency that a transaction is executed */ run_time /* The time frame in which the transaction is to be executed */ avg_log_batch /* The average number of transactions piggybacked in one LGWR write. According to an embodiment, the default value=1. */

The following are system costs that have been derived for particular hardware systems and components. These costs are used to determine utilization values for the workload upon candidate hardware systems.

LAN_packet_size /* Size of network packet size */

LAN_fixed_response /* Fixed latency time for arrival of first portion of transmitted data */

LAN_packet_xfer_time /* Percentage of time busy performing LAN transfers */ cost_CPU_phys_read: /* CPU cost of a physical read */ cost_CPU_logical_reads: /* CPU cost of a logical read */ cost_CPU_logical_writes: /* CPU cost of a logical write */ disk_read_time_rand /* Disk cost of a random physical read */ disk_read_time_seq /* Disk cost of a sequential physical read */ disk_log_write_time /* Disk cost of a log write */

The following pseudocode is used to derive CAE values for the transaction and to determine utilization values for the hardware system represented by the above system costs. Note that the calculations are made per transaction type.

/* Calculate number of transactions to be executed in a given time frame */
_trans[ ]=trans_frequency*run_time /*Calculate sequential physical reads based upon number of cache misses for the transaction type */
trans_phys_reads_seq[ ]=req_phys_reads_seq /* Calculate random physical reads based upon number of cache misses for the transaction type */
trans_phys_reads_rand[ ]=req_phys_reads_rand /* Calculate logical reads based upon number of cache hits for the transaction type */
trans_logical_reads[ ]=req_of_logical_reads /* Calculate number of transaction reads */
trans_reads[ ]=trans_physical_reads_seq+trans_physical_reads_rand+trans_logical_reads /* Calculate number of transaction writes */
trans_writes[ ]=req_writes /* Calculate the amount of network data */
trans_LAN_bytes[ ]=req_LAN_bytes /* Calculate the amount of network packets */
trans_LAN_packets[ ]=Ceil(trans_LAN_bytes/LAN_packet_size)

/* Determine the sorting cost as a function of list size (this equation assumes that sorting cost is related to the size of the sort list). "a" and "b" are derived for each system, to equalize differences between hardware systems */
sorting_cost=a*sort_list_size+b for each table /* Determine the join cost as a function of table size (for 2-table join). Multi-table join can be derived recursively based on the result of first 2 tables. "a", "b", and "c" are derived for each system to equalize differences between hardware systems */
join_cost=a*size_of_table1+b*size_of_table1*size_of_table2+c /* Determine cost of subqueries based upon complexity of the subquery */
subquery_cost=function(cost_of_subquery_CPU_complexity)

/* Calculate the number of CPU seconds incurred by sorting, joining, and processing subqueries. */
trans_CPU_complexity=(sorting_cost+join_cost+subquery_cost)

/* Determine number of CPU seconds needed for reads, writes, and other kinds of work in the system */
trans_CPU_seconds[ ]=cost_CPU_phys_read*(trans_phys_reads_seq+trans_phys_reads_rand)+cost_CPU_logical_reads*trans_logical_reads+cost_CPU_logical_writes*trans_writes+trans_CPU_complexity /* Determine busy time of disk, e.g., number of seconds that disk is busy */
trans_sync_disk_seconds[ ]=disk_read_time_rand*trans_physical_reads_rand+disk_read_time_seq*trans_physical_reads_seq /* Calculate the number of second needed to perform network transfers */
trans_LAN_seconds[ ]=LAN_fixed_response+trans_LAN_packets*LAN_packet_xfer_time /* Determine if transaction involves a log write */
trans_log_write[ ]=(trans_writes>0?1:0)

/* Calculate the time needed to perform log writes. */
trans_log_seconds[ ]=trans_log_write*(disk_log_write_time/avg_log_batch)

Asynchronous Load

The asynchronous load comprises the workload components which are not directly in the transaction path, and which comprises additional components to the steady state operation of the workload. The asynchronous load is modeled into CAE elements, and the asynchronous CAEs are added to the transactional CAEs to formulate the workload definition.

The asynchronous load components include operations which do not have to be performed before results are sent to a client application. Writes to the database can be collected and sent in batches to a batch database writer ("DBWR"). In an embodiment, DBWR writes the database buffer to disk in a clustering format, using a clustering factor to obtain writing efficiencies.

If RAID or mirroring is employed, the RAID/mirroring factor affects the physical I/O to disk. However the CPU load may not be significantly affected, since the extra writes may be controlled by a disk or array controller that is independent of the CPU.

The following environmental information are inputs to the sizing mechanism:

write_clustering_factor /* The number of logical writes combined into one DBWR write. According to an embodiment, a default value of "25" can be used. */ log_write_clustering_factor /* The number of logical writes combined into one DBWR write. Can also be the average # of txns piggybacked in one LGWR write. According to an embodiment, the default values 1, 25, or a number within the range 1–25 can be used. */ logging_frequency /* The interval between logging. According to an embodiment, a default value of 3 seconds. */

The following are system costs that have been derived for particular hardware systems and components. These costs are used to determine utilization values for the workload upon candidate hardware systems.

cost_of_physical_write /* CPU cost of a physical write (by DBWR or LGWR) */ cost_of_log_write /* CPU cost of a log write, e.g., cost of processing the data from online redo buffers */ disk_write_time /* Disk cost of a random physical write */ disk_log_write_time /* Disk cost of a log write */

The following pseudocode is used in an embodiment of the invention to determine cost and utilization values for the hardware system represented by the above system costs for asynchronous loads:

/* Determine the number of physical writes issued by DBWR */
DBWR_writes=(trans_writes*#_trans)*write_clustering_factor
/* Determine the CPU cost for all DBWR writes during run time */
DBWR_write_CPU_cost=cost_of_physical_write*total_DBWR_writes
/* Determine the disk cost for all DBWR writes during run time */
DBWR_disk_seconds=disk_write_time*total_DBWR_writes
/* Determine the number of physical writes issued by LGWR */
LGWR_writes=(trans_log_write*#_trans)*log_write_clustering_factor
/* Determine the CPU cost for all LGWR writes during run time */
LGWR_CPU_cost=cost_of_log_write*total_LGWR_writes
/* Determine the disk cost for all LGWR writes during run time */
LGWR_disk_seconds=disk_log_write_time*total_LGWR_writes
/* Determine the total CPU cost attributable to DBWR */
DBWR_CPU_cost=avg_cost_of_lru_scanning_per_run_time+DBWR_write_CPU_cost

CPU Calculation

This section describes pseudocode for determining possible CPU configurations that are appropriate to operate upon the workload. These pseudocode in this section is used iteratively (starting from the smallest system and working up) until a system is found where the required number of CPUs is supported by the system (i.e. if the utilization curve calculates that 5 CPUs are needed and the system has a maximum of 4, the system is rejected).

The utilization formulas reflect a non-linear utilization scaling curve for CPU utilization. Primary utilization is calculated from the total CPU time. This primary utilization is calculated in terms of percent of the utilization of a single CPU. The utilization curve of each system is described in terms of a cubic equation with cubic factors that correspond to the CPU under consideration. For example, for a Compaq ProLiniant computer system operating with a Pentium 100 CPU, the X values range from 0 to n (0%–n*100% where n=the number of CPUs in the system) and Y values proportional to the standard ProLiant with a single Pentium 100 CPU (0 to 2.11 for a ProLiant with 4 Pentium 100 CPUs which can process 2.11 times as many transactions as the Single CPU model). This allows the model to determine the required number of CPUs. The required throughput is listed as the transaction rate.

The following environmental and system information are inputs used to determine CPU analysis according to the sizing model:

Max_CPU_util /* maximum CPU utilization value */
CPU_optimal /* optimal CPU utilization value */
a, b, c, d /* cubic factors for CPU Utilization curve */
max_processors /* maximum number of processor to use in system */

The following pseudocode is used to determine CPU utilization and to calculate the required number of CPUs according to an embodiment of the present invention:

/* Calculate seconds of CPU activity */
CPU_seconds=(trans_CPU_seconds*#_trans)+DBWR_CPU_cost+LGWR_CPU_cost
/* Determine average CPU service time across all transactions weighted to the transaction frequency */
Avg_CPU_service_time=(trans_CPU_seconds*#_trans)/#_trans
/* Determine Average transactions per second for the workload */
transaction_rate=#_trans/run_time
/* Calculate CPU utilization (expressed as average percent CPU busy) */
CPU_util=CPU_seconds/run_time
/* Non-linear CPU utilization scaling curve */
Solve the following equation using iteration:

$$ax^3+bx^2+cx+d=y$$

where:
a, b, c, d=Cubic factors for selected system
x=total_util (0<total_util<max_processors*100%)
y=CPU_util
/* Calculate number of CPUs */
CPUs=INT(total_util/100%/Max_CPU_util)
/* Average percent of CPU reserve capacity for the system */
CPUreserve=CPU_optimal−(total_util/CPUs)

Memory Calculation

This section determines memory utilization levels and possible memory configurations for the hardware system.

The following workload, environmental, and system data information are applied as inputs to the model:

- transaction_rate /* Transaction rate in transactions per second */
- db_size /* size of the database */
- users /* number of concurrent users expected on the system */
- log_space_factor /* A factor that takes into account required logging frequency and size required for that logging frequency. According to an embodiment the default value is 3X */
- avg_redo_record_length /* Average length of a redo log entry */
- db_block_size /* database block size. */
- db_block_buffers /* buffer cache size. According to an embodiment, the default value is 50*1024*1024/db_block_size, i.e. 50 MB worth of buffer cache. */
- reserved_free_memory_% /* Amount of system memory that is free from database-related activities. According to an embodiment, an appropriate default value is 10% */
- Overhead_Processes /* Overhead processes */
- Memory_per_user /* Memory per user */
- Memory_OS /* Operating System memory */
- Memory_database /* This information is general memory that is added to compensate for the database system overhead. This value is dependent upon the particular database system that is to be employed. For an Oracle 8 database, this memory factor takes into account memory structures such as SGA, PGA, and UGA, as well as various background processes such as the DBWR and LGWR. */

The following pseudocode is used to determine the memory utilization and to calculate memory configurations:

/* Determine log buffer size in bytes. According to an embodiment, min value=8192 and max value=163840 */
log_buffers=9*transaction_rate*avg_redo_record_length
/* Set the shared pool size. The disclosed values are appropriate for sizing Oracle 8 database systems */
if db_size<4
   shared_pool=3500000 bytes
elseif db_size<20
   shared_pool=6000000 bytes
elseif db_size<300
   shared_pool=9000000 bytes
/* Set database block buffers. The disclosed values are appropriate for sizing Oracle 8 database systems in which min value=10,000*2 KB worth of db_block_buffers and max value=200,000*2 KB worth of db_block_buffers. The values are rounded up to the next 100, and DBSIZE is expressed in GB. */
db_block_buffers=(0.005*(DBSIZE*1000*1024*1024/DB_BLOCK_SIZE))
/* Total processes running on the system */
Processes=Users+Overhead_Processes
/* The system global memory for the database-referred to as the "SGA" for an Oracle 8 database system */
SGA=shared_pool+log_buffers+db_block_size*db_block_buffers
/* User memory */
Memory_User=Processes*Memory_per_user
/* System memory, including database and operating system memory */
Memory_System=Memory_OS+Memory_database
/* Total required memory */
Total_Memory=(SGA+Memory_System+Memory_User)+[(SGA+Memory_System+Memory_User)*reserved_free_memory]

Disk Calculation

This section determines disk utilization levels and possible disk configurations that is appropriate for the hardware system. The section calculates the number of disks required for the I/O load as well as the number of disks required for the size of the database. The number of disks required for the system is the greater of these two numbers.

The following workload, environmental, and system data information are applied as inputs to the model:

- db_size /* Database size */
- RAID_DATA /* RAID factor (Data files) */
- RAID_LOG /* RAID factor (Log files) */
- RAID_OS /* RAID factor (Operating System) */
- Max_Disk_IO_Util /* Maximum allowable usage of a disks IO capacity */
- Max_Disk_Space_Util /* Maximum allowable usage of a disks storage capacity */
- avg_redo_record_length /* Average length of redo logs in the database */
- Disk_Size /* Disk size */
- stripe_set_size /* Maximum number of disks combined together into a stripe set or RAID set */

The following pseudocode is used to determine the disk utilization and suggested disk configuration.

/* Determine the RAID factor for data, i.e., disk write multiplier for RAID on data drives */
if RAID_DATA=0
   RAID_FACTOR_DATA=1
if RAID_DATA=1
   RAID_FACTOR_DATA=2
if RAID_DATA=5, 4
   RAID_FACTOR_DATA=4
/* Determine the RAID factor for logs, i.e., disk write multiplier for RAID on log drives */
if RAID_LOG=0
   RAID_FACTOR_LOG=1
if RAID_LOG=1
   RAID_FACTOR_LOG=2
if RAID_LOG=5, 4
   RAID_FACTOR_LOG=4
/* Determine total seconds of data disk time required */
data_disk_seconds=trans sync_disk_seconds+DBWR_disk_seconds*RAID_FACTOR_DATA
/* Determine total seconds of log disk time required */
log_disk_seconds=LGWR_disk_seconds*RAID_FACTOR_LOG
/* Determine # of disks required for data I/O. CEIL( )represents a ceiling function */
data_disks_IO=CEIL (data_disk_seconds/run_time)/Max_Disk_IO_Util)

```
/* Determine number of disks required for data size */
data_disks_size=CEIL(db_size/(Disk_Size*Max_
    Disk_Space_Util))
/* Determine number of disks required for data size if
    RAID is employed */
if RAID_DATA=0, 4
    data_disks_size=data_disks_size
if RAID_DATA=1
    data_disks_size=data_disks_size*2
if RAID_DATA=5
    data_disks_size=data_disks_size+CEIL(data_
        disks_size/stripe_set_size)
/* Determine number of disks required for data files */
data_disks=MAX(data_disks_IO, data_disks size)
/* Determine number of disks required for data files if
    RAID is employed */
if RAID_DATA=1 and data_disks < > EVEN
    data_disks=data_disks+1
/* Determine number of disks required for operating
    system */
if RAID_OS=0
    OS_disks=1
if RAID_OS=1, 4
    OS_disks=2
if RAID_OS=5
    OS_disks=3
/* Determine number of disks required based on log I/O
    */
if RAID_LOG=0
    log_disks_IO=1
if RAID_LOG=1, 4
    log_disks_IO=2
if RAID_LOG=5
    log_disks_IO=3
/* Determine number of disks required based on log file
    size */
log_disks_size-=CEIL(LGWR_writes*avg_redo_
    record_length/(Disk_Size*Max_Disk_Space_Util))
/* Determine number of disks for log files */
log_disks=MAX(log_disks_IO, log_disks_size)
/* Determine total number of disks required */
total_disks=data_disks+OS_disks+log_disks
/* Determine average disk utilization */
Avg_data_disk_util=data_disk_seconds/(run_
    time*data_disks)
/* Determine average log disk utilization */
Avg_log_disk_util=log_disk_seconds/(run_
    time*log_disks)
```

Network Calculation

This section determines network utilization levels and possible network configurations that are appropriate to use with the workload. The network model is the part of the model that predicts LAN utilization components due to the database application. The network service time component is also collected.

The following pseudocode can be used to determine network utilization for the sizing mechanism of the present invention:

```
trans_LAN_packets /* the average number of rows that
    the transaction will touch */
/* Determine the average rate of packets being transferred
    over the network */
LAN_packet_rate=_(trans_LAN_packets*#_trans)/
    run_time
/* Determine an approximation of network utilization due
    to database activity */
LAN_util=LAN_packet_rate/LAN_packet_capacity
```

Response Times

This section estimates response times for the hardware system which are calculated for each transaction. The response time is made up of time components corresponding to disk, CPU, log, and LAN factors. These calculated response times are compared against the required response times (where specified) to determine if a system configuration is acceptable.

The following workload, environmental, and system data information are applied as inputs to the model:

Avg_data_disk_util /* Average utilization for data disks */ disk_ST_variability_factor /* Ratio of disk queue to a M/M/1 queue at the same utilization due to lower variability of disk service time. According to an embodiment, the default value is 0.8. */ scalability_factor /* Scaling of SMP systems, can be represented by % of work completed by SMP system compared to similar 1 CPU system. */

The following pseudocode can be used to determine performance estimates:

```
/* Determine expected CPU service time per transaction
    */
trans_CPU_service_time=trans_CPU_seconds*
    (total_util/CPU_util)
/* Determine expected synchronous disk service time per
    transaction */
trans_disk_service_time=trans_sync_disk_seconds
/* Determine expected LAN service time per transaction
    */
trans_LAN_service_time=trans_LAN_seconds
/* Determine expected log service time per transaction */
trans_Log_service_time=trans_Log_seconds
/* Determine expected response time per transaction */
trans_response_time=trans_CPU_service_time*(1+
    CPU_util/(CPUs*(1-CPU_util)))+trans_disk_
    service_time*(1+disk_ST_variability_factor*Avg_
    data_disk_util/(1-Avg_data_disk_util))+trans_
    LAN_service_time+trans_Log_service_time
/* The following is an alternate process for determining
    expected response time per transaction */
trans_response_time=trans_CPU_service_time/(1-
    CPU_util)+trans_disk_service_time*(1+disk_ST_
    variability_factor*Avg_data_disk_util/(1-Avg_
    data_disk_util))+trans_LAN_service_time+trans_
    Log_service_time
```

Evaluate Hardware System

Based upon the above calculations, hardware systems are evaluated to determine if they are suitable to operate the workload of interest. According to one embodiment, the following criteria are reviewed in making this determination:

(a) whether the values for required SSU is less than the maximum SSUs for each subsystem/whether the utilization levels are below the maximum allowable levels; and (b) whether the response times of one or more transactions are below allowable levels. Based upon these criteria, one or more hardware systems may be found acceptable for the evaluated workload.

If multiple hardware systems have been found suitable for the workload, then further criteria are evaluated to determine which of the acceptable systems is to be recommended. According to an embodiment, the following criteria are reviewed:

(a) which system is the most desirable system in terms of performance;

(b) which system is most desirable in terms of cost; and (c) which system is most desirable in terms of configuration (e.g., expanability, upgradability, etc.).

Note that the foregoing calculations and evaluations have been made in the context of entire systems. The calculations and evaluations can also be made on a subsystem basis, in which separate subsystem units are separately selected for their suitability to handle aspects of the workload. The final collection of subsystem components can be thereafter evaluated in its system entirety for suitability. In addition, the sizing can be performed with a combination of these approaches, in which base hardware systems are evaluated, and separate subsystem components are also evaluated in conjunction with the base system.

System Architecture Overview

Figure 6:
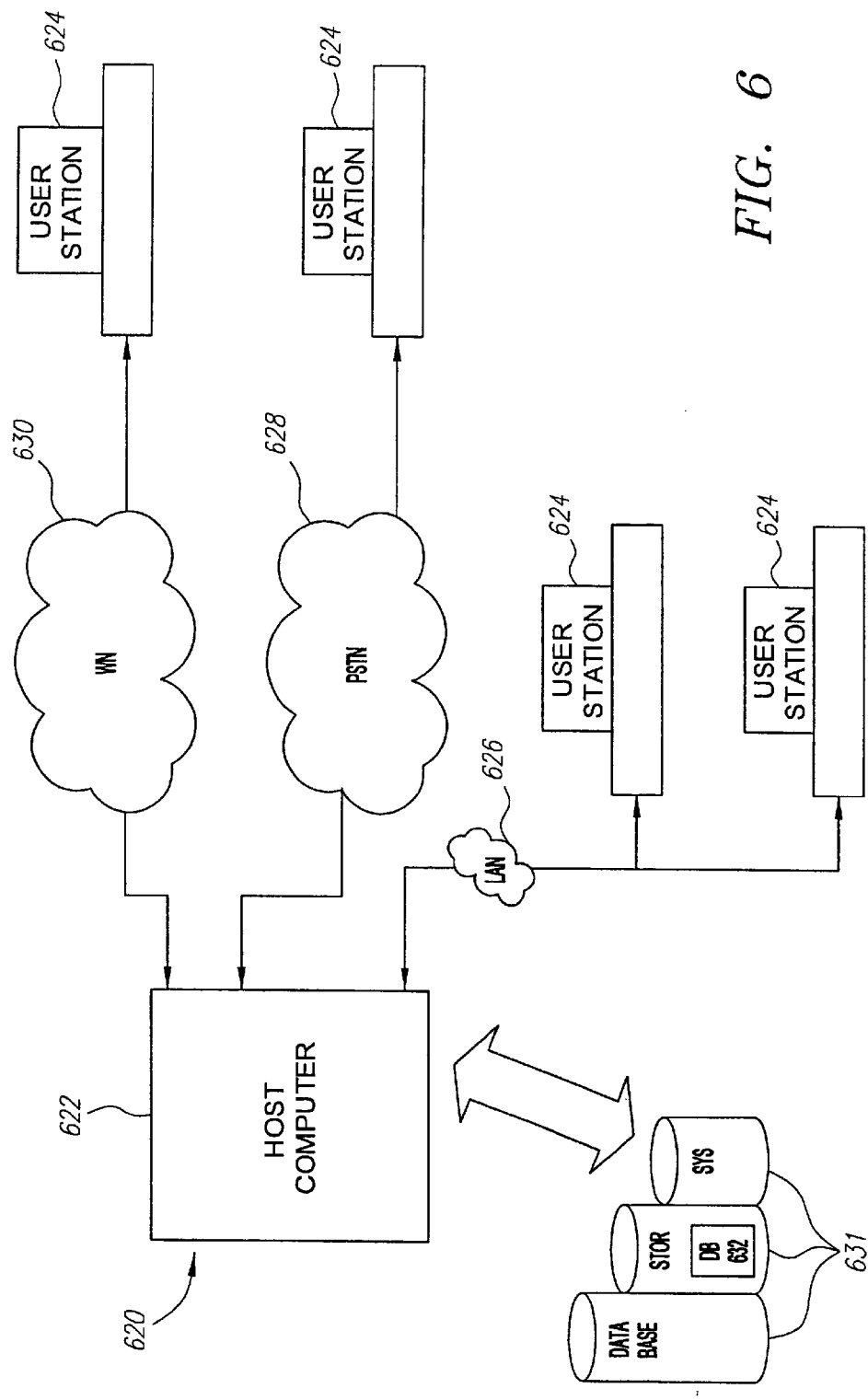
FIG. 6 is a diagram of computer hardware with which the present invention can be implemented.

Referring to FIG. 6, in an embodiment, a computer system 620 includes a host computer 622 connected to a plurality of individual user stations 624. In an embodiment, the user stations 624 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 7:
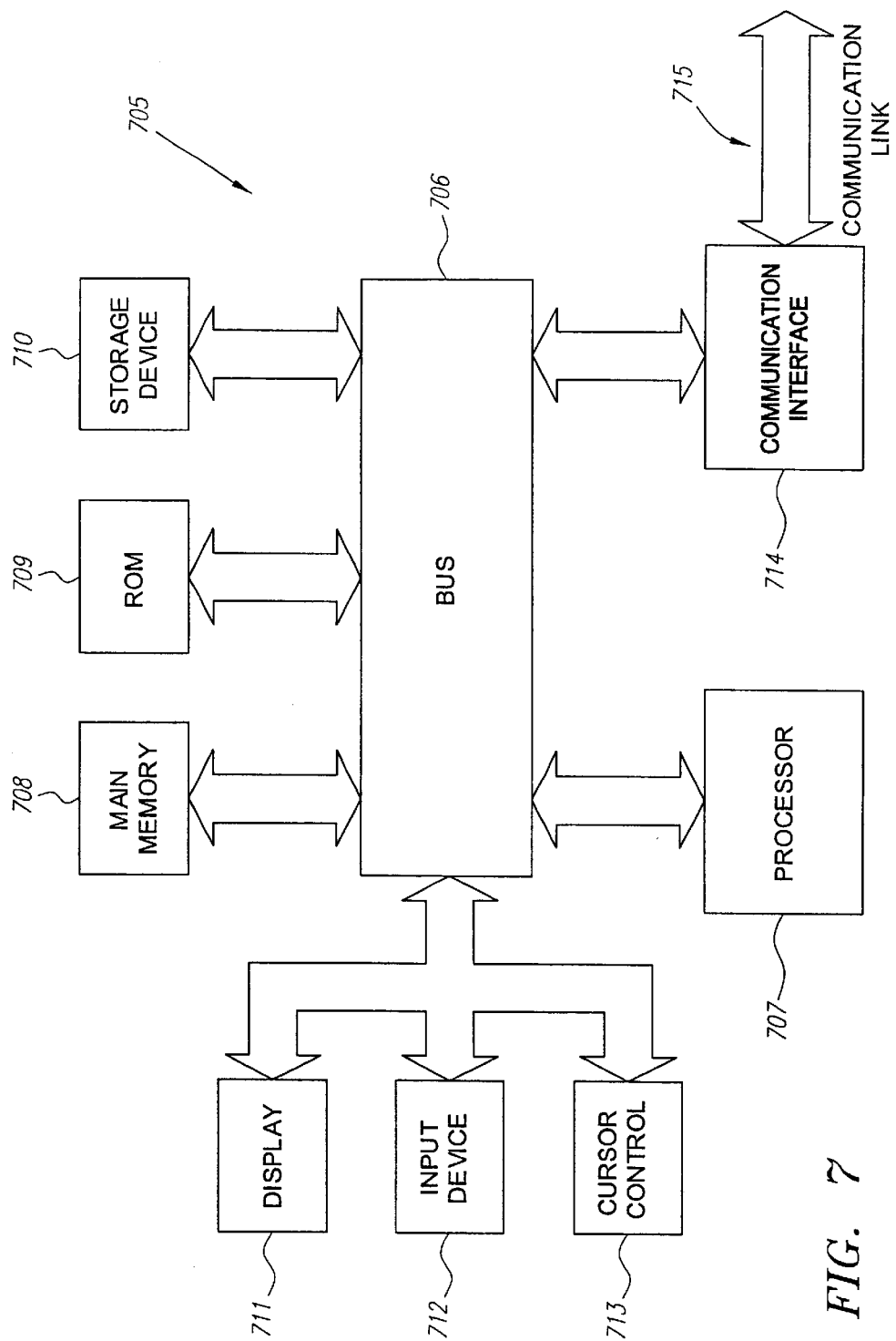
FIG. 7 is a diagram of additional computer hardware with which the present invention can be implemented.

Referring to FIG. 7, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for deriving parametric data for a hardware system, comprising:
   executing a first software statement, said first software statement involving a first operation of a system activity, said system activity not directly associated with a specific hardware platform;
   recording a first set of performance results based upon execution of said first software statement;
   executing a second software statement, said second software statement involving a second operation of said system activity;
   recording a second set of performance results based upon execution of said second software statement;
   comparing said first set of performance results against said second set of performance results; and
   deriving parametric data for said hardware system based upon comparison of said first set of performance results against said second set of performance results.

2. The method of claim 1 in which said first software statement is executed a plurality of times.

3. The method of claim 2 in which said first set of performance results comprise an average of results for multiple executions of said first software statement.

4. The method of claim 1 further comprising:
   executing a third software statement, said third software statement involving a third operation of said system activity;
   recording a third set of performance results based upon execution of said third software statement;
   comparing said third set of performance results against said first set of performance results; and
   profiling said hardware system based upon comparison of said third set of performance results against said first set of performance results.

5. The method of claim 1 in which said first software statement involves an operation of a second system activity, said second system activity differing from said first system activity.

6. The method of claim 1 in which said first and second software statements comprise database statements.

7. The method of claim 6 in which said database statements comprise SQL statements.

8. The method of claim 1 in which numeric methods for solving simultaneous equations are used to compare said first set of performance results against said second set of performance results.

9. The method of claim 8 in which said numeric methods for solving simultaneous equations comprise linear programming.

10. The method of claim 8 in which said numeric methods for solving simultaneous equation comprise taking the difference between said first set of performance results and said second set of performance results.

11. The method of claim 1 in which said system activity comprises a set of activities used to characterize a database.

12. The method of claim 1 in which said system activity comprises an activity selected from the group consisting of logical reads, physical reads, logical writes, physical writes, log writes, log reads, sequential reads, sequential writes, random reads, random writes, and network usage.

13. A computer program product that includes a medium usable by a processor, the medium having stored thereon a sequence of instructions which, when executed by said processor, causes said processor to execute a process for deriving parametric data for a hardware system, said process comprising:
   executing a first software statement, said first software statement involving a first operation of a system activity, said system activity not directly associated with a specific hardware platform;
   recording a first set of performance results based upon execution of said first software statement;
   executing a second software statement, said second software statement involving a second operation of said system activity;
   recording a second set of performance results based upon execution of said second software statement;

comparing said first set of performance results against said second set of performance results; and deriving parametric data for said hardware system based upon comparison of said first set of performance results against said second set of performance results.

14. The computer program product of claim 13 in which said first software statement is executed a plurality of times.

15. The computer program product of claim 13 further comprising:

executing a third software statement, said third software statement involving a third operation of said system activity;

recording a third set of performance results based upon execution of said third software statement;

comparing said third set of performance results against said first set of performance results; and profiling said hardware system based upon comparison of said third set of performance results against said first set of performance results.

16. The computer program product of claim 13 in which said first software statement involves an operation of a second system activity, said second system activity differing from said first system activity.

17. The computer program product of claim 13 in which said first an second software statements comprise database statements.

18. The computer program product of claim 13 in which numeric methods for solving simultaneous equations are used to compare said first set of performance results against said second set of performance results.

19. The computer program product of claim 13 in which said system activity comprises a set of activities used to characterize a database.

20. A system for deriving parametric data for a hardware system, comprising:

means for executing a first software statement, said first software statement involving a first operation of a system activity, said system activity not directly associated with a specific hardware platform;

means for recording a first set of performance results based upon execution of said first software statement;

means for executing a second software statement, said second software statement involving a second operation of said system activity;

means for recording a second set of performance results based upon execution of said second software statement;

means for comparing said first set of performance results against said second set of performance results; and means for deriving parametric data for said hardware system based upon comparison of said first set of performance results against said second set of performance results.

21. The system of claim 20 in which said first software statement is executed a plurality of times.

22. The system of claim 20 further comprising:

means for executing a third software statement, said third software statement involving a third operation of said system activity;

means for recording a third set of performance results based upon execution of said third software statement;

means for comparing said third set of performance results against said first set of performance results; and means for profiling said hardware system based upon comparison of said third set of performance results against said first set of performance results.

23. The system of claim 20 in which said first software statement involves an operation of a second system activity, said second system activity differing from said first system activity.

24. The system of claim 20 in which said first an second software statements comprise database statements.

25. The system of claim 20 in which numeric methods for solving simultaneous equations are used to compare said first set of performance results against said second set of performance results.

26. The system of claim 20 in which said system activity comprises a set of activities used to characterize a database.

\* \* \* \* \*